United States Patent

[11] 3,555,944

[72] Inventor: Kiyoshi Imamura, Kyoto-fu, Japan
[21] Appl. No.: 818,898
[22] Filed: Apr. 24, 1969
[45] Patented: Jan. 19, 1971
[73] Assignee: Nippon Safety Glass Co., Ltd., Kanagawa-ken, Japan
[32] Priority: May 2, 1968
[33] Japan
[31] 43/29095

[54] DEVICE FOR SCORING GLASS SHEETS
3 Claims, 6 Drawing Figs.
[52] U.S. Cl. .................................................. 83/12, 33/27, 83/565
[51] Int. Cl. ............................................................ B26d 3/08
[50] Field of Search ............................................. 33/27K; 144/144; 90/62; 83/12, 565

[56] References Cited
UNITED STATES PATENTS
| | | | |
|---|---|---|---|
| 552,293 | 12/1895 | Kuhn | 33/27 |
| 2,156,847 | 5/1939 | Gregory | 33/27 |

Primary Examiner—James M. Meister
Attorney—Waters, Roditi, Schwartz, & Nissen

ABSTRACT: A device for scoring glass sheets by following the profile of an outer periphery of a template for the purpose of breaking the glass sheets. The device comprises an integrally and stepwise-formed shaft means including a center shaft, an intermediate offset shaft, and a third offset shaft forming the longitudinally lowest part and radially outermost part of the shaft means, and a cutter means mounted at the lower end of the third shaft. The intermediate shaft is urged in a direction to keep the center shaft in operative engagement with the template. A follower roller means can be mounted on the center shaft to facilitate the engagement with the template.

PATENTED JAN 19 1971

DEVICE FOR SCORING GLASS SHEETS

This invention relates to a device for scoring glass sheets, and more particularly to a device for scoring glass sheets by profiling the outer periphery of a template.

An object of the present invention is to provide a device for scoring glass sheets for breaking the glass sheets by profiling the outer periphery of a template which makes it possible to make curved scores effectively with a very small radius of curvature.

According to the present invention in order to attain the aforesaid object, there is provided a device for scoring glass sheets by profiling the outer periphery of a template comprising an integrally and stepwise-formed shaft means including a center shaft, an intermediate offset shaft, and a third offset shaft, said third shaft being longitudinally and radially more spaced apart from said center shaft than said intermediate shaft and the axis thereof being in parallel relation in the same plane with the axes of the intermediate and center shafts, and a wheel cutter rotatably supported at the tip of said third offset shaft for scoring glass sheets, said intermediate shaft being urged in a direction to follow the accurate profile of the outer periphery of the template. The device for scoring glass sheets further comprises a follower roller means rotatably mounted at the distal end of the center shaft so as to slidably engage the outer periphery of the template. In another embodiment of the present invention, the template has a tapered outer surface and the follower roller also has at least one tapered outer surface corresponding to that of the template.

Other objects and features of the present invention will be fully understood from the following description taken in conjunction with the accompanying drawings, in which.

Similar parts and members are designated by the same numerals and symbols throughout the drawings.

In a device for scoring glass sheets by profiling the outer periphery of a template or guide plate while urging a follower roller against the template by a force F, if the device has a scoring wheel cutter rotatably mounted at the tip of a shaft concentrically extending along the axis of the follower roller, the cutter can make scores, by profiling the configuration of the template as long as the outer periphery of the template is a smooth curve with a radius of curvature larger than a certain limit. However, if the radius of curvature of the template periphery becomes smaller than the certain limit, especially at a right-angled corner, the cutter moves along an arcuate locus with the radius of the follower roller and the configuration of the outer periphery of the template cannot reproduce accurately in the scores formed on the glass sheets.

Figure 1:
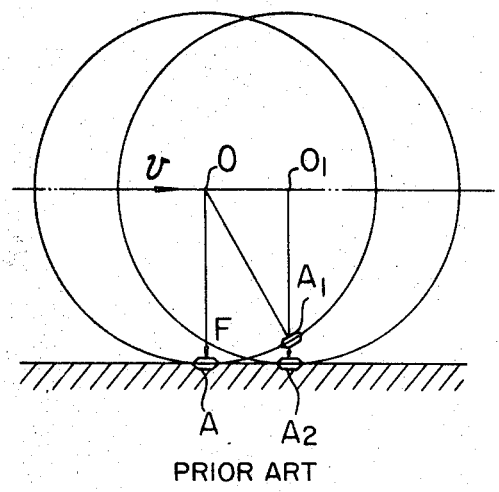
FIG. 1 is a diagrammatic illustration of the operative conception of a known device for scoring glass sheet.
Figure 1A:
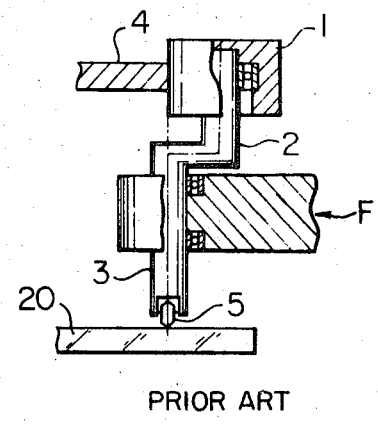
FIG. 1a is a schematic side view of the known scoring device embodying the conception of FIG. 1.

In order to obviate such a difficulty, it has been proposed to use an eccentric or offset shaft, as shown in FIG. 1a. In the FIG., a follower roller 1 has a concentric shaft 2, and an eccentric shaft 3 is integrally connected to the concentric shaft 2 with an offset equivalent to the radius of the follower roller 1. In other words, the axis of the eccentric shaft 3 intersects the outer periphery of the follower roller 1. The eccentric shaft 3 is urged toward a template 4 by a force F. A wheel cutter 5 is concentrically mounted at the lower end of the eccentric shaft 3, as shown in FIG. 1a. A glass sheet 20 is scored by the rotation of the wheel cutter 5 while moving the follower roller 1 along the outer periphery of the template 4.

Referring to FIG. 1, illustrating the operative conception of the scoring device of FIG. 1a, the wheel cutter 5 at the position A, which is offset from the axis 0 of the follower roller and rolling along the outer periphery of the template 4, is urged by the force F extended normally to the periphery of the template. At the same time, the axis of the follower roller is moved by a driving force along the periphery of the template at a velocity $v$. The follower roller is also rotated by the force F, but since the force F is exerted at a right angle with respect to the moving direction of the follower roller, the side faces of the cutter turn perpendicularly to the urging force F and the roller is usually in a position which facilitates said roller to rotate in the advancing direction.

Even if the wheel cutter should be moved from the position A to another position $A_i$ for some reason or other, shown in FIG. 1 and the center of the follower roller should be moved from the position 0 to $0_1$, the force urging the follower roller toward the template is exerted through the point $0_1$. Thus the wheel cutter moves to the position $A_2$, i.e., the outermost position from the point $0_1$, due to the force exerted perpendicularly on the template. By repeating such a movement, the follower roller rolls along the template outer periphery and causes the wheel cutter to move on the corresponding locus for making the desired scores on the glass sheet. More exactly, the cutter receives not only the normal force F, but also the driving force $v$ transmitted from the follower roller. As a result, the composite force of the two forces F and $v$ has a small deviation from the normal line to the template outer periphery, or the cutter is urged to the template periphery in a slightly deviated angular relation. As long as the template outer periphery is smooth with a large radius of curvature, the aforesaid small deviation of the composite force does not introduce any serious error in the movement of the cutter, and scores can be formed by exactly reproducing the configuration of the template periphery. However, if the radius of curvature of the outer periphery of the template becomes smaller than a certain limit, the cutter begins to fluctuate angularly about axis 0 of the follower roller because of the two forces F and $v$. Consequently, at such an acute corner with a small radius of curvature, since the offset shaft is not perpendicularly urged with respect to the template, the faces of the wheel cutter, in the transition position, cannot turn exactly to a right angle with respect to a perpendicular line from the axis of the follower roller to the related portion of the outer periphery of the template. Accordingly, at such an acute corner, the scoring on the glass sheet is deviated from the template configuration.

The inventor made studies on the solution of such difficulties, and as a result, he has discovered the following fact. Suppose that a cutter roller received a driving force which acts on the axis 0 of a follower roller to move it parallel with the template periphery, and that the cutter roller also receives an urging force toward the template outer periphery, said urging force exerting at the axis of an intermediate shaft offset from the axis 0 and located close to the cutter roller. Under such conditions, even at an acute corner with a very small radius of curvature, the wheel cutter is actuated by a force exerted perpendicularly to the template periphery, which force is transmitted from the intermediate shaft located on a perpendicular plane from the follower roller axis 0 to the template periphery. The last mentioned force acts only in a direction to urge the wheel cutter to the template periphery, but not in a direction to rotate or fluctuate the wheel cutter about the follower roller axis 0. Thus, the cutter can score the glass sheet while exactly following the template outer periphery.

Figure 2:
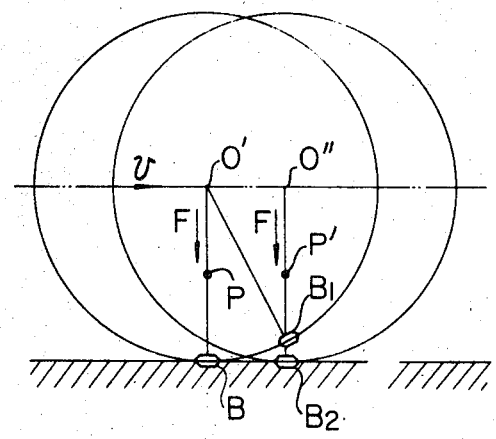
FIG. 2 is a diagrammatic illustration of the operative conception of scoring motion in a device according to the present invention.

The conception of such a cutter movement will now be described in further detail, referring to FIG. 2. An intermediate offset shaft P is integrally formed with the shaft of the follower roller, and another shaft carrying the wheel cutter is integrally formed with the intermediate offset shaft. In a plan view, the axial projection point of the intermediate shaft is located on a line connecting the axial projection point 0 of the follower roller with the projection point of said other or third shaft carrying the cutter and the three axes are in parallel relation. As in the case of FIG. 1, assume that the wheel cutter is moved from a position B to another position $B_1$. As the axis of the follower roller moves from a position 0' to another position 0'', the intermediate shaft moves to a position P'. If the intermediate shaft P is urged by an urging force toward the template in a direction perpendicular to the template periphery, the effect of such urging force is not changed by the movement of the intermediate shaft P to the position P'. The wheel cutter thus moves from the position $B_1$ to $B_2$, so as to follow the shape of the template periphery, as in the case of FIg. 1. With the arrangement of FIG. 2, the driving force $v$ acting on the follower roller simply causes the follower roller to slide along the template outer periphery. The urging force F acting on the intermediate shaft P in a direction perpendicular to the template periphery simply urges the cutter to the template, and does not cause the wheel cutter to rotate about the axis of the follower roller by acting at a point between an acting point and the cutter. Consequently, the wheel cutter moves while exactly following the configuration of the template outer periphery without deviating therefrom, so that the scoring can be made by exactly reproducing the template configuration.

Figure 3:
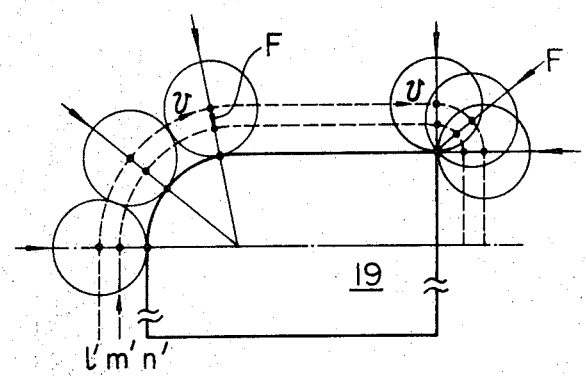
FIG. 3 is a schematic view of a scoring device, illustrating various shaft positions of the scoring device relative to a template.

The present invention is based on the aforesaid discovery. The device of the invention will now be described in further detail referring to FIGS. 3 to 5. An integral step-shaped shaft means 11 includes a center and upper shaft 12, an intermediate offset shaft 13, and another offset or third shaft 14. As shown in a plan view seen in the direction of the arrow C of FIG. 4, the projection points of the axes $l$, $m$, and $n$ of the shafts 12, 13 and 14 are on a radius extending from the axis $l$, said axis $n$ being spaced farther away from the axis $l$, as shown at $n'$, $m'$, and $l'$ in the plan view shown in dotted outline. The center shaft 12 has an assembly of a pair of truncated conical members 15 and 16 concentrically mounted thereon in tandem. Suitable bearings 10 extend through central holes of the truncated conical members so as to rotatably support them. The intermediate offset shaft 13 is rotatably carried by a pushing means 17 through a suitable bearing means. A wheel cutter 18 is rotatably mounted at the lower end of the shaft 14 by a suitable known means, and the cutter can be rotated about the mounting pin of the shaft 14. The outer peripheral edge of a template 19 is slanted at the same slope as that of the upwardly convergent truncated conical members 15 and 16. The numeral 20 represents a glass sheet to be scored by the wheel cutter 18.

Figure 4:
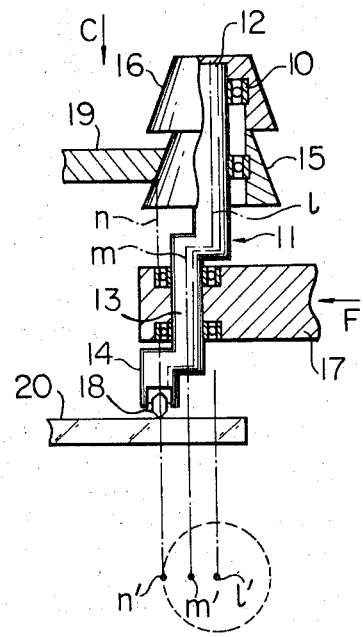
FIG. 4 is a schematic and partial sectional view of a scoring device according to the present invention, showing a template and a follower roller thereof and a fragmental plan view of the axes thereof.

Referring to FIG. 4, the scoring device having the cutter 18 mounted at the lower end of the shaft means 11 is moved on the glass sheet 20, while exerting a force F on the shaft means by the pushing means 17 at a right angle with respect to the outer periphery of the template, and then the truncated conical member 15 rolls along the periphery of the template. As a result, the wheel cutter scores the surface of the sheet 20, while the member 15 is profiling the outer periphery of the template. In this case, due to the urging force F applied to the intermediate shaft 13 by the pushing means, the wheel cutter 18 moves directly underneath a predetermined level (in the illustrated embodiment, the lower end) of the slanted edge of the template periphery, so as to score the glass sheet while exactly reproducing the configuration of the template. Even when the shaft means encounters an acute corner of the template, e.g. a right-angled corner, the urging force F effectively urges the shaft means to the template in a direction perpendicular to the template outer periphery, so that there is not produced any force tending to rotate the shaft means 11 about the axis $l$ of the center shaft 12. Thus, the scoring can be made exactly profiling the configuration of the template, even at right-angled corner portions, as shown at the upper right corner of FIG. 3.

Figure 5:
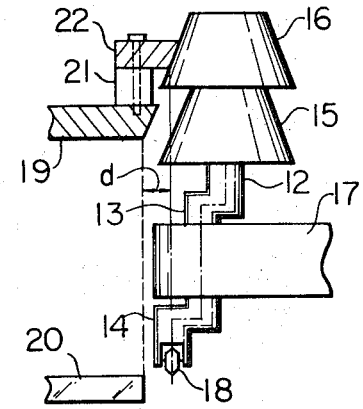
FIG. 5 is another schematic sectional view of the scoring device showing the follower roller in the state as engaging a guide plate mounted on the template.

FIG. 5 illustrates the use of a guide plate, which is useful for making nonclosed scoring, or for moving the scoring device along the template without actually effecting the scoring the sheet glass. A guide plate 22 is mounted on the template 19 with spacers 21 inserted therebetween. The operative edge of the guide plate 22 is slanted or tapered with the same gradient with that of the peripheral edge of the template 19. As the intermediate shaft 13 is urged towards the template 19 at a right angle with respect to the outer periphery, the upwardly convergent surface of the truncated conical member 16 engages the slanted surface of the guide plate 22, so that the cutter comes directly underneath a predetermined point of the truncated conical member 16, or directly beneath the lower end of the slanted surface of the guide plate. Thus, the wheel cutter moves away from the corresponding position of the template periphery. Consequently, as the cutter traces along a line outwardly offset from the corresponding peripheral line of the template, the glass sheet is not scored as long as the truncated conical member 16 engages the guide plate 22.

As described in the foregoing in the case of scoring glass sheet by profiling the outer periphery of a template, the device according to the invention can precisely score the surface of the glass sheet even at an acute corner of the template with a very small radius of curvature. If the peripheral edges of the template and the guide plate mounted on the template are slanted or tapered, and if the cooperating edge of the follower roller is similarly tapered, a glass sheet can be scored following any desired peripheral edge portion of the template by securing the template at a suitable height. Furthermore, instead of the truncated conical follower roller members 15 and 16, it is possible to bring the center shaft 12 in direct contact with the template, so as to score the glass sheet by moving the shaft 12 along the template while urging the intermediate shaft toward the template by suitable pushing means. is, of course, possible not to slant or taper the peripheral edge of the template, so that the glass sheet can be scored by causing a cylindrical follower roller to engage the template.

Although the present invention has been described with reference to particular embodiments, it is understood that the present disclosure has been made by way of example and that numerous changes and modifications in the details of construction and the combination and arrangement of parts may be resorted to without departing from the scope of the invention as hereinafter claimed.

I claim:

1. A device for scoring glass sheets by profiling the outer periphery of a template, comprising an integrally and stepwise-formed shaft means including a center shaft, an intermediate offset shaft and a third offset shaft, said third offset shaft being longitudinally and radially spaced at a greater distance from said center shaft than said intermediate offset shaft and the axes of said shafts being parallel and in the same plane, and a wheel cutter rotatably supported at the tip of said third offset shaft for scoring the glass sheets, said intermediate shaft being urged in a direction to follow the profile of the outer periphery of the template.

2. A device for scoring glass sheets as defined in claim 1, further comprising a follower roller means rotatably mounted at the distal end of the center shaft so as to slidably engage the outer periphery of the template.

3. A device for scoring glass sheets as defined in claim 2, wherein said template has a tapered outer surface and said follower roller also has at least one tapered outer surface corresponding to that of the template.